US011245747B2

(12) United States Patent
Sundar M et al.

(10) Patent No.: US 11,245,747 B2
(45) Date of Patent: *Feb. 8, 2022

(54) MONITORING A BUILDING MANAGEMENT SYSTEM

(71) Applicant: Honeywell International Inc., Morris Plains, NJ (US)

(72) Inventors: Deepak Sundar M, Bangalore (IN); Soumen Ghosh, Bangalore (IN); Rajesh Kulandaivel Sankarapandian, Madurai (IN); Raveendran Manickam, Salem (IN); Paramesh Muthuraj, Salem (IN); Ganesh N, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/853,446

(22) Filed: Apr. 20, 2020

(65) Prior Publication Data

US 2020/0296153 A1 Sep. 17, 2020

Related U.S. Application Data

(63) Continuation of application No. 15/660,708, filed on Jul. 26, 2017, now Pat. No. 10,666,717, which is a continuation of application No. 14/447,854, filed on Jul. 31, 2014, now Pat. No. 9,729,618.

(51) Int. Cl.
*H04L 29/08* (2006.01)
*H04W 4/60* (2018.01)

(52) U.S. Cl.
CPC .............. *H04L 67/10* (2013.01); *H04W 4/60* (2018.02)

(58) Field of Classification Search
CPC ................................. H04L 67/10; H04W 4/60
See application file for complete search history.

(56) References Cited

U.S. PATENT DOCUMENTS

| 7,113,090 | B1 | 9/2006 | Saylor et al. | |
| 8,356,248 | B1 | 1/2013 | Killalea | |
| 2004/0030531 | A1 | 2/2004 | Miller et al. | |
| 2006/0038672 | A1 | 2/2006 | Schoettle | |
| 2007/0033632 | A1 | 2/2007 | Baynger et al. | |
| 2008/0001735 | A1* | 1/2008 | Tran ...................... | G16H 80/00 340/539.22 |
| 2008/0294662 | A1 | 11/2008 | Chen | |
| 2008/0309449 | A1* | 12/2008 | Martin ................... | G08B 25/14 340/3.1 |

(Continued)

OTHER PUBLICATIONS

"SmartStruxure™ solution", Schneider Electric Website <http://www2.schneider-electric.com/sites/corporate/en/products-services/buildings/smartstruxure/videos.page>, 1 pg. Date Accessed: Jul. 30, 2014.

(Continued)

*Primary Examiner* — Ziaul Karim
(74) *Attorney, Agent, or Firm* — Seager, Tufte & Wickhem, LLP

(57) ABSTRACT

Devices, methods, and systems for monitoring a building management system are described herein. One method includes monitoring an attribute of a building, monitoring an activity related to the attribute performed by an operator, and publishing the activity performed by the operator and the attribute of the building.

19 Claims, 4 Drawing Sheets

(56) References Cited

U.S. PATENT DOCUMENTS

| | | |
|---|---|---|
| 2009/0045937 A1* | 2/2009 | Zimmerman .......... G08B 17/00 |
| | | 340/506 |
| 2010/0106543 A1 | 4/2010 | Marti |
| 2010/0162110 A1 | 6/2010 | Williamson |
| 2010/0192207 A1 | 7/2010 | Raleigh |
| 2010/0318200 A1 | 12/2010 | Foslien et al. |
| 2011/0087988 A1 | 4/2011 | Ray et al. |
| 2011/0167343 A1 | 7/2011 | Wright et al. |
| 2012/0022700 A1 | 1/2012 | Drees et al. |
| 2012/0166497 A1 | 6/2012 | Choi et al. |
| 2013/0002697 A1 | 1/2013 | Ashley et al. |
| 2013/0173062 A1 | 7/2013 | Koenig-Richardson |
| 2014/0049402 A1 | 2/2014 | Beaulieu et al. |
| 2015/0109104 A1 | 4/2015 | Fadell et al. |
| 2015/0156031 A1 | 6/2015 | Fadell et al. |
| 2015/0163412 A1* | 6/2015 | Holley ............... G06K 9/00771 |
| | | 348/143 |
| 2016/0121151 A1* | 5/2016 | Schmitt .................. A62C 35/60 |
| | | 169/46 |

OTHER PUBLICATIONS

"IBM Tririga Energy Optimization", Version, I, Release I, IBM Website <http://pic.dhe.ibm.com/infocenter/tivihelp/v57r1/topic/com.ibm.iteo.doc/infocenter.pdf>, Jun. 2012, 184 pgs.

"CleanSource Operator Interface, Active Power—Intuitive UPS operator interface", Active Power, Inc. <http://www.activepower.com/documents/datasheets/DISP-US-w.pdf>, 2 pgs. Date Accessed: Jul. 30, 2014.

* cited by examiner

MONITORING A BUILDING MANAGEMENT SYSTEM

PRIORITY INFORMATION

This application is a Continuation of U.S. application Ser. No. 15/660,708, filed Jul. 26, 2017, which is a continuation of U.S. application Ser. No. 14/447,854, filed Jul. 31, 2014, now U.S. Pat. No. 9,729,618, issued Aug. 8, 2017, which are incorporated herein by reference.

TECHNICAL FIELD

The present disclosure relates to devices, methods, and systems for monitoring a building management system.

BACKGROUND

Building information modeling (BIM) can refer to the generation and/or management of data associated with a building (e.g., data associated with the components, equipment, and/or properties of the building). For example, BIM data can include architectural, mechanical, electrical, plumbing, sanitary, fire, and/or geometrical information associated with a building.

BIM data associated with a building can be used to generate a user interface for a building management system for the building, which can be displayed to a user (e.g., operator) and used to monitor and/or control the building. For example, the user (e.g., operator) of a building management system can check and/or set the state of a control component(s), equipment, device(s), network (s) area(s), and/or space(s) of the building using the user interface of the building management system. The user interface with multiple views can include, for example, the floor plan of the building, with additional information about the building (e.g., information about a device(s) of the building, information about a control network(s) of the building, schematic graphics of the building, etc.) overlaid on the floor plan. The building management system (e.g., the user interface displayed to the operator) can be two or three dimensional.

DETAILED DESCRIPTION

Figure 1:
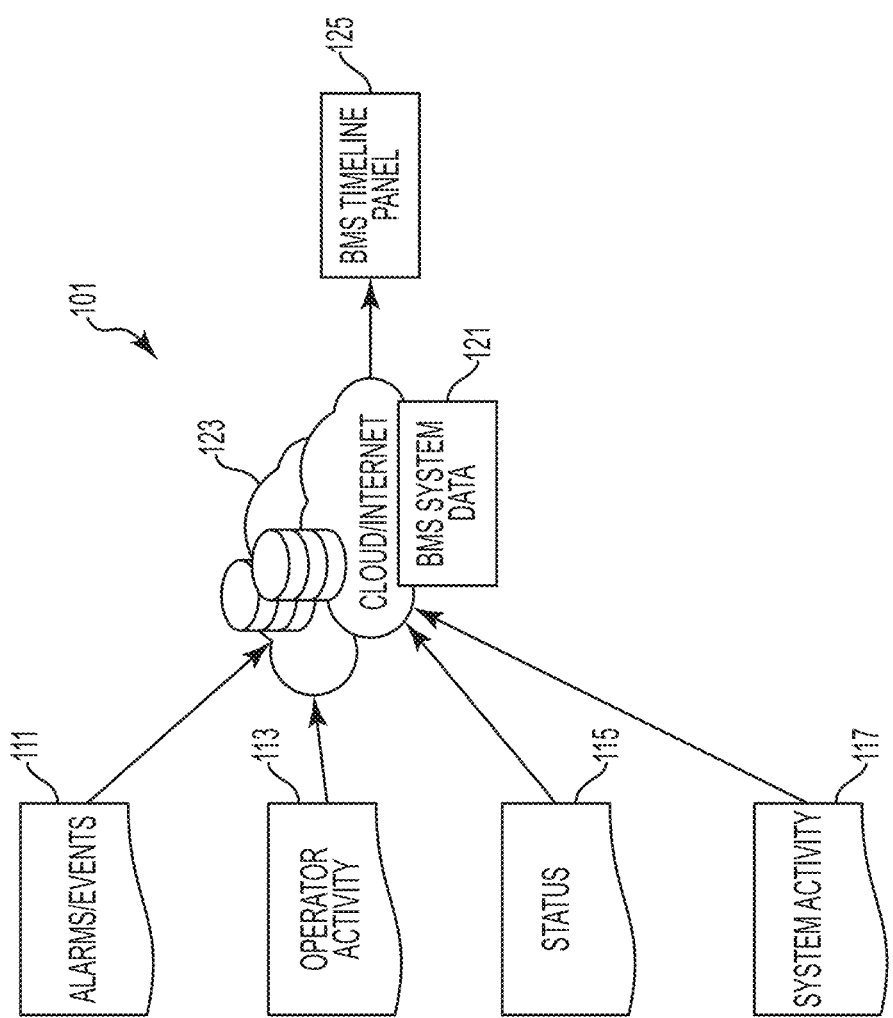
FIG. 1 illustrates a system for monitoring a building management system in accordance with one or more embodiments of the present disclosure.

Devices, methods, and systems for monitoring a building management system (BMS) and operator activities are described herein. For example, one or more embodiments include monitoring an attribute of a building, monitoring an activity related to the attribute performed by an operator, and publishing the activity performed by the operator and the attribute of the building.

Embodiments of the present disclosure can decrease the amount of time and/or computing resources needed to monitor and analyze a large amount of BMS data. Further, aggregation of BMS data and operator activity data generated in accordance with the present disclosure can be less cluttered and/or interact more efficiently with the user and/or operator of the BMS than building management systems generated in accordance with previous approaches. Further, monitoring of the BMS and operator activity of the BMS in accordance with the present disclosure can quickly and effectively respond to real time changes in the status of the building, real-time operator activity, and/or the equipment therein.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of buildings" can refer to one or more buildings.

FIG. 1 illustrates a system 101 for monitoring a building management system (e.g., a system used to control a building) in accordance with one or more embodiments of the present disclosure. Monitoring the building management system can include, for example, collecting, analyzing, and/or displaying characteristics and/or attributes of the building.

The system 101 can use a computing device, such as, for instance, a laptop computer, a desktop computer, or a mobile device (e.g., a mobile phone, a smart phone, a personal digital assistant, etc.), among other types of computing devices, to monitor the building management system. For example, the system 101 can include the computing device 440 described in connection with FIG. 4.

A building management system (BMS) can generate a large number of events to monitor, store, and/or analyze. As shown in FIG. 1, the system 101 can include data 111 related to a number of alarms that are triggered by an event(s). The data can be stored in a database (not shown in FIG. 1).

An alarm and/or event can be related to an attribute of the BMS. For example, an attribute can include temperature, humidity, accessibility, sensor status, etc. The attribute can indicate a particular status of the BMS at a particular location of the BMS. For example, the attribute can include an alarm indicating an event associated with the building. The alarms (and/or events) can include heating/cooling/air conditioning (HVAC) alarms, video alarms, access alarms, fire system alarms, sub-system alarms, etc. For example, a threshold temperature can be set and an alarm can signal that the temperature has reached the threshold (e.g., lowered to a lower temperature or increased to a higher temperature). As an additional example, the attribute can include an indication of an energy usage increase in the building.

In some embodiments, a video monitoring a location can activate an alarm when motion is detected. An access alarm can indicate when a user (e.g., a visitor, an employee, etc.) has entered a particular room and/or building. A fire system alarm can indicate the occurrence of a fire in the building. A sub-system alarm can indicate an event that has occurred in a sub-system of the building management system.

As shown in FIG. 1, the system 101 can include data 113 related to operator activity. The operator activity can include an indication of when, during a period of time, an action by the operator occurred. Operator activity can include a message and/or comments entered into the BMS by an operator and an indication of what the message relates to (e.g., a message about a fire alarm in a sector of the building). Operator activity can include an indication by the operator that the operator has acknowledged an alarm. Operator activity can include creation of a report in relation to an event and/or an alarm. Operator activity can include changes to a configuration of the building (e.g., changes to allowed access by visitors, changes to access of employees, changes to temperature configurations, etc.).

As shown in FIG. 1, the system 101 can include data 115 related to a status of the BMS. A status can include an indication of a status of a particular location in the BMS, a sensor of the BMS, and/or a device status of the BMS. A status can include a sub-system status. A status can include an operator status. For example, an operator status can include that the operator is monitoring the BMS data. The operator status can include that the operator has verified a particular BMS event and/or action.

As shown in FIG. 1, the system 101 can include data 117 related to system activity. System activity can include a number of scheduled tasks of the system. For example, a temperature and/or humidity check can be performed by the system (e.g., the BMS). System activity can include sending a message about an alert (e.g., by electronic mail, voicemail, text messaging, etc.). System activity can include reporting particular calculations and/or determinations of the system.

System activity can include control operations such as operations to control attributes and/or events of the system. For example, a control operation can include controlling a temperature of a zone of the BMS. A control operation can include controlling access by a user to a particular physical location in the BMS. System activity can include communication with integrated systems within the BMS. For example, an HVAC system can communicate with a user access system to coordinate particular environment (e.g., temperature, etc.) preferences by a user accessing the system. System activity can include actions based on a need of a sub-system. For example, a sub-system can request a particular action of the system and the system can respond by performing the requested action.

BMS system data 121 illustrated in FIG. 1 can be an aggregation of the alarm and/or event data 111, the operator activity data 113, the status data 115, and the system activity data 117 that is communicated to a central location, such as a cloud (e.g., a cloud computing environment) and/or the internet 123. The stored BMS system data 121 can be analyzed at the cloud/internet location 123. The BMS system data 121 (comprising the system and operator activities) can be stored, monitored, and analyzed. For example, an attribute of the building, and the activity related to the attribute performed by the operator, can be stored, monitored, and analyzed. The attribute, the activity related to the attribute, and the analysis can then be published, for example, on a timeline, as will be further described herein. For instance, the published attribute and related activity may correspond to a past time period, a present time period, and/or a future time period. If the published attribute and related activity correspond to a future time period, the activity may be an activity expected to be performed by the operator during the future time period, and the building may be expected to demonstrate the attribute during the future time period.

The analysis can be based on activities performed by the system and/or the operator (e.g., the operator activity data 113 and the system activity data 117). For example, BMS data related to the building management system and the operator activities can be analyzed based on an indication of an alarm in the building, an operator status, a previous operator activity, and a system activity. System activity can include a system behavior, a system trend, and a system response. The analysis of the BMS data and the operator activities can include determining a change in at least one of the indications. For example, the system activity and/or behavior can change based on an alarm turning off.

As an additional example, the analysis can be based on a deviation of the BMS data 121 from previously stored historical data. The analysis can be based on a trend and/or pattern of the BMS data 121. The analysis can be based on a criticality of the BMS data 121.

As an additional example, the analysis can include determining which of the operator activities were in response to which BMS data 121, and/or determining whether further operator activity is requested.

In some embodiments, the analysis can include filtering the BMS data 121 to determine what is most important to the BMS system. The filtering analysis can be based on a criticality and a process relationship of the BMS data 121. A criticality can define an importance of an attribute. For example, an activated fire alarm may be given a higher criticality than a humidity fluctuation. The process relationship of the BMS data 121 can include a relationship of at least one attribute to another attribute in the BMS data 121. The process relationship can organize information and determine shared vocabulary and meanings for terms with respect to other terms.

For example, a fire alarm can have a process relationship with an HVAC system. When a fire is indicated in a location, the HVAC dampers in the location will be closed. Organizing information related to the fire and defining similar terms allows the two systems to work together to solve the problem of the fire. Another example includes a process relationship with an access system and lighting. When a user enters a particular location, the lights in the particular location can be turned on. The criticality and process relationship of the BMS data 121 is used to filter the BMS data 121 in order to be displayed on a BMS timeline panel 125 illustrated in FIG. 1. However, the BMS data 121 can be displayed on a BMS timeline panel 125 as autoposts, information, actions, warnings, recommendations, etc. That is, the BMS data 121 can be displayed with and/or without particular analysis. In addition, the BMS data 121 can be filtered using criticality and/or process relationships to determine which data to publish. For example, data can be published with a higher criticality and/or with more process relationships.

The BMS timeline panel 125 can be a real-time display of events and actions of the system and an operator (and/or operators). The BMS Timeline Panel 125 can illustrate past, present, and future recommended actions.

For example, the BMS timeline panel 125 can include data related to past actions that caused a fire. A present fire alarm can be displayed to indicate where the fire is located and what sectors are affected. The BMS timeline panel 125 can indicate recommended action to extinguish the fire and prevent further damage. Examples of the BMS timeline panel 125 are illustrated in FIG. 2 and FIG. 3.

Figure 2:
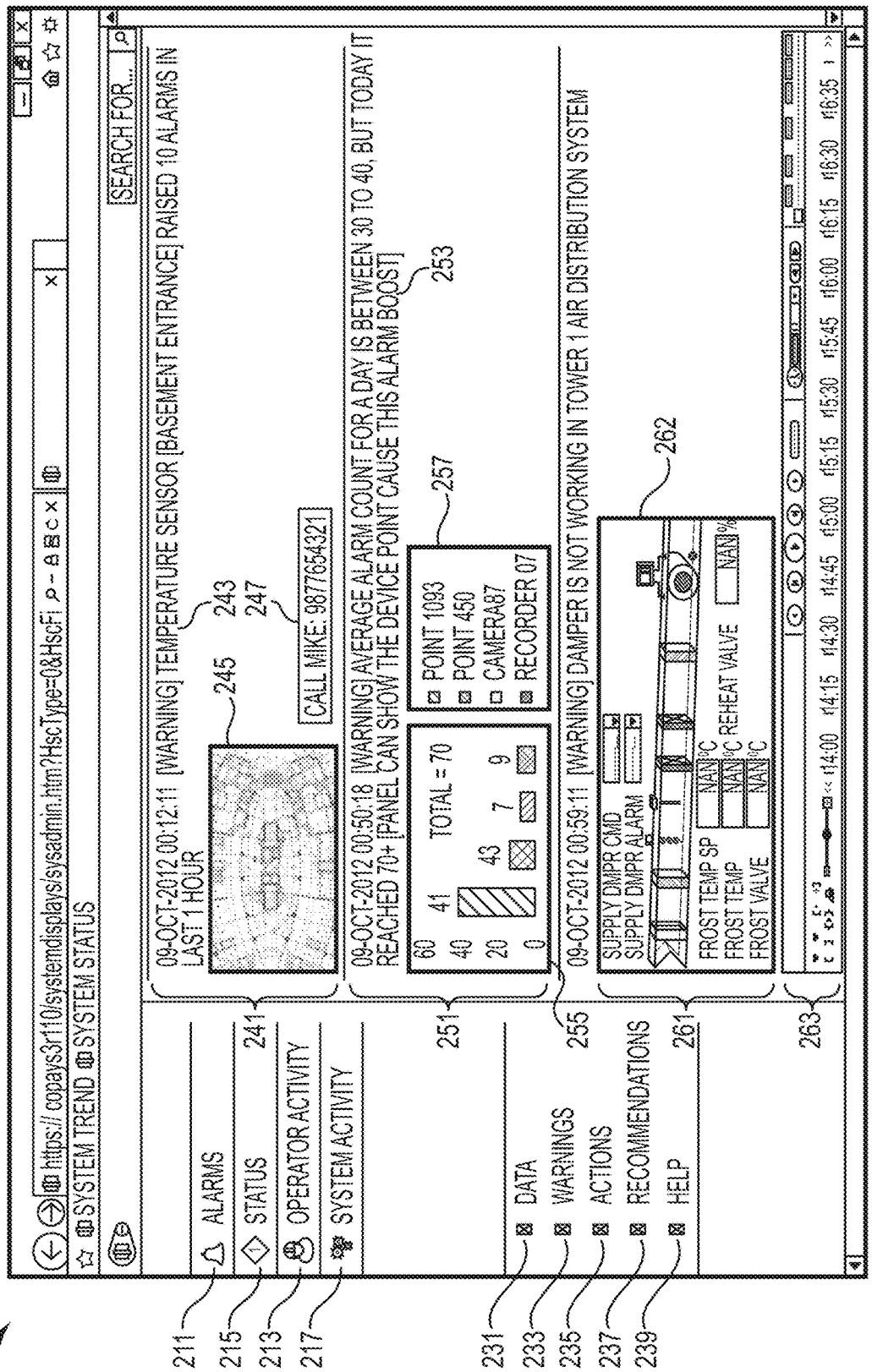
FIG. 2 illustrates a display for monitoring a building management system in accordance with one or more embodiments of the present disclosure.
Figure 3:
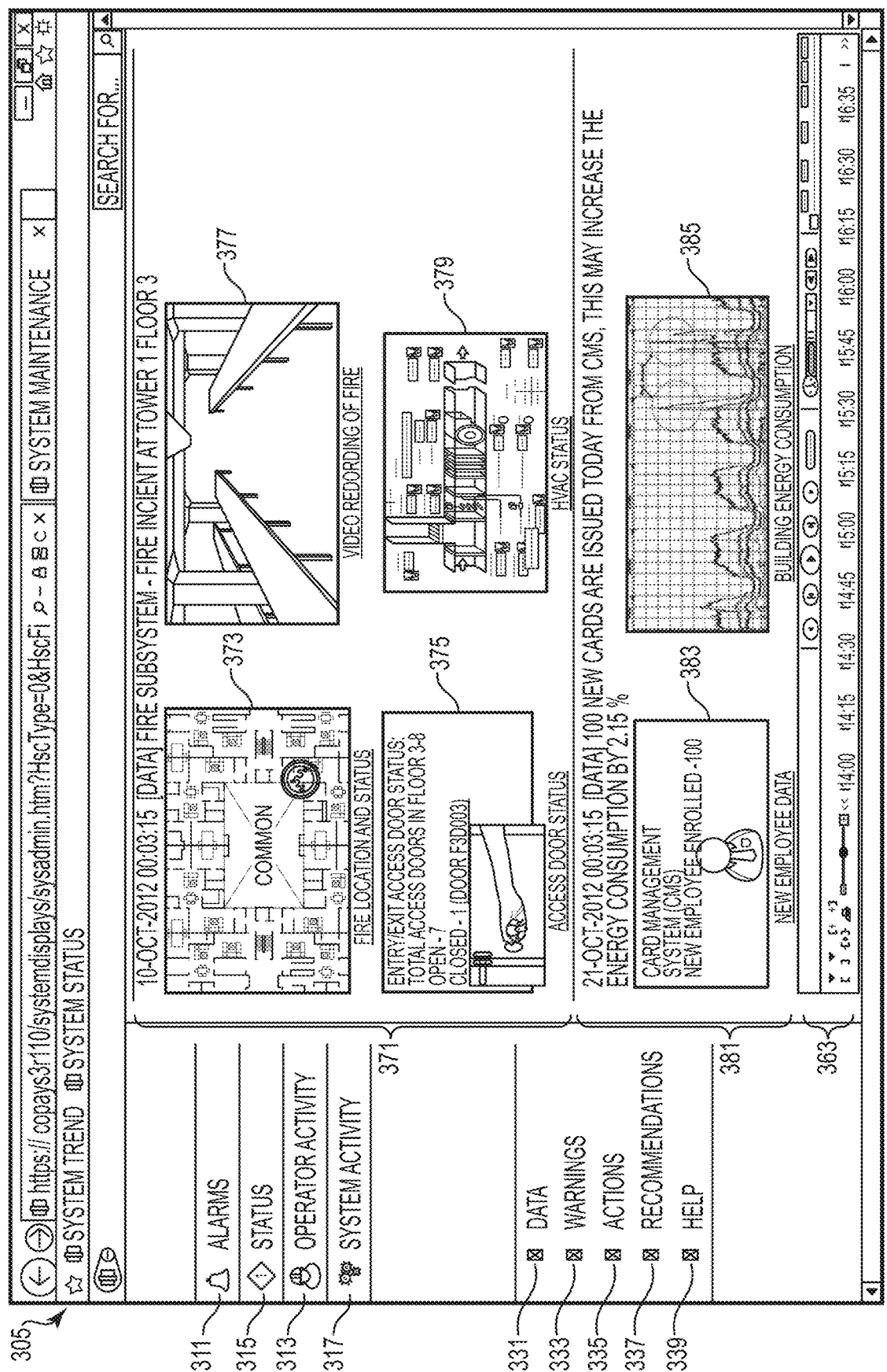
FIG. 3 illustrates a display for monitoring a building management system in accordance with one or more embodiments of the present disclosure.

FIG. 2 illustrates a display (e.g., graphical display) 203 for monitoring a building management system in accordance with one or more embodiments of the present disclosure. Graphical display 203 can be provided (e.g., displayed, published, and/or presented) to a user of a computing device, such as computing device 440 described in connection with FIG. 4. The graphical display 203 can be displayed (e.g., displayed, published, and/or presented) in an internet browser of a computing device (e.g., computing device 440). However, embodiments are no so limited.

The display 203 is an example of a timeline panel (e.g., BMS timeline panel 125 in FIG. 1). As shown in FIG. 2, the graphical display 203 can include a first set of icons related to information input from the BMS system data and activities. The icons related to BMS system data and activities are related to alarms 211 (corresponding to alarm/events data 111 in FIG. 1), status 215 (corresponding to status data 115 in FIG. 1), operator activity 213 (corresponding to operator activity data 113 in FIG. 1), and system activity 217 (corresponding to system activity data 117 in FIG. 1).

As shown in FIG. 2, the display 203 can include a second set of icons that refer to analyzed data of the BMS system. The icons of the analyzed data include data 231, warnings 233, actions 235, recommendations 237, and help 239. The data related to the second set of icons can be used to determine a course of action based on collected and analyzed data related to the first set of icons. Each icon can be selected in the timeline panel 203 and used to access the information related to that icon. For example, by selecting the alarms icon 211, the user can access alarms that were triggered in the BMS system. By selecting the status icon 215, the user can access a display of a number of statuses of the BMS system.

As shown in FIG. 2, the BMS timeline panel 203 can include a number of displayed illustrations of the BMS data (e.g., readouts of the data). A display (e.g., a published post) on the BMS timeline panel 203 can include a video clip (if the published post includes a video clip), an image, text, audio, link to configuration page, chart, etc. depending on the context of the event and/or alarm.

In the example illustrated in FIG. 2, timeline panel 203 includes a warning display 241 that details a temperature warning. The warning text 243 indicates that a temperature sensor of a basement entrance raised 10 alarms in the last hour. The warning display 241 can include a location map 245 that indicates where the temperature sensor raised the alarms. The warning display 241 indicates, at 247, to call Mike at 987654321 for further information and/or to resolve the temperature issue.

In the example illustrated in FIG. 2, timeline panel 203 includes a warning display 251 that details an alarm count warning. The alarm count text 253 indicates that an average daily alarm count is between 30 and 40 but that an alarm count of the current day has reached over 70. The alarm count graph 255 illustrates the number of alarm counts for that day. The alarm count device and/or point indicator 257 indicates designated points (e.g., point 1093 and point 450) or devices (e.g., camera 87 and recorder 07).

In the example illustrated in FIG. 2, timeline panel 203 includes a damper display 261 that details a damper that is not working. The building diagram 262 illustrates a location of the damper that is not working.

In the example, illustrated in FIG. 2, The BMS timeline panel 203 includes a timeline 263 that indicates time intervals during a particular day that can be selected to view the events and/or alarms for that day at that timepoint on the timeline. The time 14:00 265 is designated as the beginning of the timeline in the example. The beginning and end of the timeline 263 can be adjusted using arrows at the left and the right of the timeline 263. The BMS timeline panel 203 can include a calendar and a timeline controller (e.g., to control timeline 263) to see activities in real-time, in a playback mode. The video playback controls can include play, pause, play forward, play backward, fast-forward, fast rewind, jump (e.g., jump 15 minutes from current time), frame by frame (activity by activity), etc.

FIG. 3 illustrates a display 305 for monitoring a building management system in accordance with one or more embodiments of the present disclosure. Graphical display 305 can be provided (e.g., displayed and/or presented) to a user of a computing device, such as computing device 440 described in connection with FIG. 4, in a manner analogous to that previously described herein in connection with graphical display 203.

The display 305 is an example of a timeline panel (e.g., BMS timeline panel 125 in FIG. 1). As shown in FIG. 2, the graphical display 305 can include a first set of icons related to information input from the BMS system data and activities. The icons related to BMS system data and activities are related to alarms 311 (corresponding to alarm/events data 111 in FIG. 1), status 315 (corresponding to status data 115 in FIG. 1), operator activity 313 (corresponding to operator activity data 113 in FIG. 1), and system activity 317 (corresponding to system activity data 117 in FIG. 1).

As shown in FIG. 3, the display 305 can include a second set of icons that refer to analyzed data of the BMS system. The icons of the analyzed data include data 331, warnings 333, actions 335, recommendations 337, and help 339. The data related to the second set of icons can be used to determine a course of action based on collected and analyzed data related to the first set of icons. Each icon can be selected in the timeline panel 305 and used to access the information related to that icon. For example, by selecting the alarms icon 311, the user can access alarms that were triggered in the BMS system. By selecting the status icon 315, the user can access a display of a number of statuses of the BMS system.

In the example illustrated in FIG. 3, timeline panel 305 includes a data event 371 that can include an indication of a fire sub-system that has a fire incident. The first incident is at Tower 1 of Floor 3. The fire location and status map 373 illustrates where the fire is located and the status of the fire at that location. For example, data of the BMS system can include a location related to the data so that the event and/or alarm can be located in the BMS system. The entry/exit display 375 indicates which doors are opened and closed. For example, the entry/exit display indicates that Door F3D003 is closed. The video display 377 is a video recording of the fire at Tower 1 Floor 3. The HVAC status display 379 indicates the status of the HVAC system at a particular time period. Data from the displays of the fire location and status map 373, entry/exit 375, video 377, and HVAC status 379 can be analyzed together to determine a recommended action (e.g., recommendations 337) based on the status of the fire, the location of the fire, which doors are opened or closed, and how the internal system (e.g., HVAC temperature, etc.) is affected by the fire.

In the example illustrated in FIG. 3, timeline panel 305 includes a timeline 363 that can be used to move to a previous, current, and/or future (e.g., recommended actions) time period to display the events and/or alarms, actions taken (e.g., of the operator and/or BMS system), and status of the BMS system. The timeline 363 can be used to predict an attribute of the building that corresponds to a future time period. The building can be expected to demonstrate the attribute during the future time period. A display of an attribute of the BMS system can include a system behavior, a system trend, and a system response. The system behavior, trend, and/or response can be used to predict future behavior of the BMS system.

In the example illustrated in FIG. 3, timeline panel 305 includes a display 381 that illustrates an interaction between the number of cards issued (e.g., identification cards for users) and energy consumption. The card management display 383 illustrates that 100 new employees have been enrolled that day. The energy display 385 illustrates that the energy consumption can be expected to increase with an increase in the number of new employees.

In some embodiments, the display (such as displays 203 and 305) can include a display to illustrate actions already taken by an operator in response to an alarm and/or event. The display can include operator comments along with the actions taken. The display can include an illustration of what the operator was monitoring at a particular time or during a particular time period. The display can include a trend of the alarms and or warnings. The display can illustrate which devices are triggering more alarms. The display can illustrate when a new operator is expected to begin monitoring a particular station. The display can illustrate details about an operation (e.g., identification, training, etc.), when the operator logged on for her shift, when the operator logged off, etc.

The BMS system can be monitored for a plurality of attributes of the BMS (e.g., temperature, access, humidity, etc.), and the plurality of operator activities in response to the attributes can be monitored and displayed, as previously described herein. A determination of which operator activities affects which attributes of the BMS can be performed. Analysis of the plurality of attributes and the plurality of operator activities can include correlating chronologically on the timeline the plurality of attributes and the plurality of operator activities. The analysis can determine how the plurality of operator activities changes the plurality of attributes of the BMS. The activity of the operator can result in the BMS timeline panel indicating at an action to take, a warning, and/or a recommendation that corresponds to the activity of the operator and the attribute of the building. For example, if a door near a fire has been closed but the fire gets larger as a result, the recommendation can include opening that door and closing a nearby door to limit airflow in a different way and extinguish the fire. The recommendation can be based on the activity of the operator. For example, the recommendation can be based on a deviation of an attribute of the building from a pattern and/or the activity of the operator from a pattern. The attributes, operator activities, and indications can be published in the BMS timeline panel.

The data published on the BMS Timeline panel can be sent by the operator to another operator, to another user, etc. An operator can maintain his own panel for his own reference and reporting. The information on the panel can be stored in a web/data/cloud server for future recovery (e.g., in the case of a failure, digital crash, etc.). Context specific information can be loaded for any selected published display (e.g., video, image, text, audio, charts, graphs, link to configuration page, etc.). Activities related to a particular operator can be published on a display for that particular operator so that the operator can react quickly and efficiently. The operator can bookmark an activity in the timeline and add comments for future reference. The operator can select a particular time period of the timeline and export as a video clip and/or other related data for that time period. In this way, the high-level data (interconnected and interrelated data from multiple sources) and the low-level data (basic information for each location, sub-sector, attribute, etc.) history of BMS incidents and system activities can be published in a single panel for review by the operator and/or other maintenance personnel.

Figure 4:
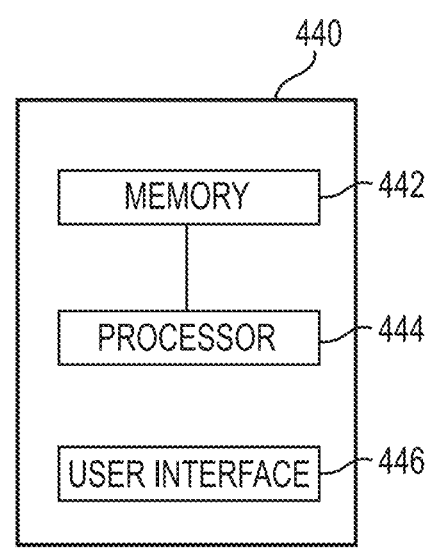
FIG. 4 illustrates a computing device for monitoring a building management system in accordance with one or more embodiments of the present disclosure.

FIG. 4 illustrates a computing device 440 for monitoring a building management system in accordance with one or more embodiments of the present disclosure. Computing device 440 can be, for example, a laptop computer, a desktop computer, or a mobile device (e.g., a smart phone, a tablet, a personal digital assistant, etc.), among other types of computing devices.

As shown in FIG. 4, computing device 440 can include a memory 442 and a processor 444 coupled to memory 442. Memory 442 can be any type of storage medium that can be accessed by processor 444 to perform various examples of the present disclosure. For example, memory 442 can be a non-transitory computer readable medium having computer readable instructions (e.g., computer program instructions) stored thereon that are executable by processor 444 to monitor a building management system in accordance with one or more embodiments of the present disclosure.

Memory 442 can be volatile or nonvolatile memory. Memory 442 can also be removable (e.g., portable) memory, or non-removable (e.g., internal) memory. For example, memory 442 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 442 is illustrated as being located in computing device 440, embodiments of the present disclosure are not so limited. For example, memory 442 can also be located internal to another computing resource (e.g., enabling computer readable instructions to be downloaded over the Internet or another wired or wireless connection).

As shown in FIG. 4, computing device 440 can also include a user interface 446. User interface 446 can include, for example, a display (e.g., a screen). The display can be, for instance, a touch-screen (e.g., the display can include touch-screen capabilities). User interface 446 (e.g., the display of user interface 446) can provide (e.g., display and/or present) information to a user of computing device 440. For example, user interface 446 can provide a display (e.g., display 203 in FIG. 2 and/or 305 in FIG. 3) which displays attributes of a building, operator activities in relation to the attributes, and/or a timeline panel to indicate chronology of events, actions, recommendations, etc. In some embodiments, the display can allow for providing general information about a building and/or particular (e.g., specific) information about the building. For example, a high-level map of buildings of an entire campus location can be displayed. In another example, a particular room of a building can be displayed. Icons (e.g., icons 211, 213, 215, 217, 231, 233, 235, 237, and 239 in FIG. 2) can provide an ability to select more general or more particular information.

The user of computing device 440 can be, for example, an operations and/or domain analyst of the building. However, embodiments of the present disclosure are not so limited. For example, the user can be any person and/or entity responsible for diagnosing, fixing, and/or resolving problems (e.g., faults and/or abnormalities) associated with the building, and/or to any person and/or entity responsible for diagnosing and/or improving poor performance (e.g., poor performance factors) of the building. Further, the user and computing device 440 may be co-located (e.g., the user and computing device may both be located in the building), or the user and computing device 440 may not be co-located (e.g., the user may remote into computing device 440 via a network).

Additionally, computing device 440 can receive information from the user of computing device 440 through an interaction with the user via user interface 446. For example, computing device 440 can receive input from the user, such as a selection of one of the number of actions to take in response to the program associated with the particular component, as previously described herein. The user can enter the input into computing device 440 using, for instance, a mouse and/or keyboard, or other peripheral, associated with computing device 440 (e.g., user interface 446), or by touching user interface 446 in embodiments in which user interface 446 includes a touch-screen.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for monitoring an operator's activities when operating a building management system, comprising:
    recording one or more alarms, events and/or attributes of the building management system;
    recording one or more activities of an operator made in responding the one or more alarms, events and/or attributes of the building management system;
    a processor analyzing how the one or more activities of the operator affected the one or more alarms, events and/or attributes of the building management system;
    for at least one of a past time period, a current time period, and a future time period, publishing one or more of the activities of the operator, one or more of the alarms, events and/or attributes of the building management system, and the analysis of how one or more of the activities of the operator affected one or more of the alarms, events and/or attributes of the building management system during the corresponding time period; and
    wherein the one or more alarms, events and/or attributes of the building management system and the one or more activities of an operator made in responding to the one or more alarms, events and/or attributes of the building management system are recorded to a cloud server.

2. The method of claim 1, wherein the building management system comprises a Heating, Cooling and/or Air Conditioning (HVAC) system, and one or more of the alarms, events and/or attributes correspond to the HVAC system.

3. The method of claim 1, wherein the building management system comprises a security system, and one or more of the alarms, events and/or attributes correspond to the security system.

4. The method of claim 1, wherein the building management system comprises a fire system, and one or more of the alarms, events and/or attributes correspond to the fire system.

5. The method of claim 1, wherein one or more of the activities of the operator and one or more of the alarms, events and/or attributes of the building management system are published on a timeline.

6. The method of claim 5, wherein one or more of the activities of the operator and one or more of the alarms, events and/or attributes of the building management system are chronologically arranged on the timeline.

7. The method of claim 1, wherein for a future time period, one or more of the activities of the operator are recommended activities for the operator.

8. The method of claim 1, wherein for a future time period, one or more of the alarms, events and/or attributes of the building management system are expected alarms, events and/or attributes.

9. The method of claim 1, wherein the processor is part of the cloud server.

10. A non-transitory computer-readable medium having computer readable instructions stored thereon that are executable by a processor to:

record to a cloud server a plurality of attributes of a building management system and a plurality of operator activities made in response to one or more of the plurality of attributes, wherein the plurality of attributes include one or more of a temperature, a humidity, an accessibility, a status, an alarm, and an event;

monitor the plurality of attributes of the building management system over time;

monitor the plurality of operator activities made in response to one or more of the plurality of attributes over time;

determine how the plurality of operator activities changed one or more of the plurality of attributes;

receive an update to the plurality of attributes; and provide a recommendation to respond to the updated plurality of attributes based on how the plurality of operator activities were determined to change one or more of the plurality of attributes.

11. The non-transitory computer-readable medium of claim 10, wherein the building management system comprises a Heating, Cooling and/or Air Conditioning (HVAC) system.

12. The non-transitory computer-readable medium of claim 10, wherein the building management system comprises a security system.

13. The non-transitory computer-readable medium of claim 10, wherein the building management system comprises a fire system.

14. The non-transitory computer-readable medium of claim 10, wherein the determining, receiving and providing are executed on the cloud server.

15. The non-transitory computer-readable medium of claim 10, wherein the computer readable instructions that are executable by the processor are further configured to publish one or more of the plurality of operator activities, one or more of the plurality of attributes and the recommendation to a display.

16. A cloud server for monitoring a building management system, comprising:

a memory; and a processor configured to execute executable instructions stored in the memory to:

record in the memory of the cloud server one or more alarms, events and/or attributes of the building management system;

record in the memory of the cloud server one or more activities of an operator made in responding the one or more alarms, events and/or attributes of the building management system;

analyze how the one or more activities of the operator affected the one or more alarms, events and/or attributes of the building management system; and for at least one of a past time period, a current time period, and a future time period, publish one or more of the activities of the operator, one or more of the alarms, events and/or attributes of the building management system, and the analysis of how one or more of the activities of the operator affected one or more of the alarms, events and/or attributes of the building management system during the corresponding time period to a display.

17. The device of claim 16, wherein one or more of the activities of the operator and one or more of the alarms, events and/or attributes of the building management system are published on a timeline.

18. The device of claim 17, wherein one or more of the activities of the operator and one or more of the alarms, events and/or attributes of the building management system are chronologically arranged on the timeline.

19. The device of claim 16, wherein for a future time period, one or more of the activities of the operator are recommended activities for the operator.

* * * * *